United States Patent [19]
Merk

[11] 3,726,250
[45] Apr. 10, 1973

[54] INDICATOR

[75] Inventor: Paul Joseph Merk, Chomedey, Quebec, Canada

[73] Assignee: Canadian Marconi Company, Montreal, Quebec, Canada

[22] Filed: Mar. 18, 1971

[21] Appl. No.: 125,498

[52] U.S. Cl...............116/129, 116/116, 116/129 L, 240/1 EL, 250/227, 340/380, 350/96 B
[51] Int. Cl...............................................G09f 9/00
[58] Field of Search....................116/116, 57, 129 L, 116/129 E, 124.4; 340/324 R, 262, 380, 225, 264, 309.4, 263; 58/50 R; 73/499; 250/227; 350/96 B; 240/1 EL, 8.16

[56] References Cited

UNITED STATES PATENTS

| | | | |
|---|---|---|---|
| 618,646 | 1/1899 | Crane, Jr. | 58/50 R |
| 1,433,989 | 10/1922 | Echternach | 340/263 |
| 1,486,379 | 3/1924 | Jackson | 73/499 X |
| 2,382,251 | 8/1945 | Parker et al. | 340/380 |
| 2,561,508 | 7/1951 | Gregorie et al. | 116/129 |
| 2,702,518 | 2/1955 | Swartzlander | 116/57 |
| 2,887,679 | 5/1959 | Curva | 340/264 |
| 3,157,854 | 11/1964 | Riley | 340/262 X |
| 3,590,774 | 7/1971 | Solow | 116/116 |
| 3,158,432 | 11/1964 | Arend et al. | 350/96 B X |
| 3,213,179 | 10/1965 | Clauson | 250/227 X |
| 3,542,451 | 11/1970 | Washburn | 350/96 B |
| 3,558,895 | 1/1971 | Hartmann | 350/96 B |
| 3,631,478 | 12/1971 | McNaney | 340/380 |

*Primary Examiner*—Louis J. Capozi
*Attorney*—Fetherstonhaugh & Co.

[57] ABSTRACT

In an indicator device, the usual pointer is replaced, in accordance with the invention, by a path of moving light which comprises an illuminatable path. The path is illuminatable from one end to the other in such a manner that, when a portion of the path is illuminated, then all of the path from one end thereof to the portion is illuminated while the remainder of the path, from the other end thereof to the portion, is not illuminated. The illuminatable path preferably comprises a plurality of individually illuminatable elements, and, preferably, each of the elements comprises strands of optical fiber.

3 Claims, 3 Drawing Figures

INDICATOR

This invention relates to an indicator device utilizing a novel indicating means for indicating an observed condition or a change in the observed condition on an indicator face, and an indicator utilizing the novel means. More specifically, this invention relates to an indicator device which utilizes an illuminatable path to indicate the state of an observed condition or a change in the observed condition.

In most present indicators, the state of an observed condition, or a change therein, is indicated by a pointer means operating in co-operation with a scale located at or beyond the moving end of the pointer. The pointer, of course, undergoes mechanical motion and therefore requires mechanical means to drive it. Both the pointer and the drive means are subject to the wear and tear associated with mechanical moving parts.

In addition, with circular indicators where the scale is adjacent the outer edge of the circle, or in rectangular indicators where the scale is located adjacent three or more outer edges thereof, both the pointer and the driving mechanism will obscure the central part of the face and thus render it less useful for the purpose of including readout means therein.

In an indicator device in accordance with the invention, no mechanical movement or drives are required to indicate the state of an observed condition or a change therein. Further, the center of a circular or rectangular indicator device is not obscured by the indicating means and may be used for further readout means. In addition, it has been observed that, when observing a display of a change in condition on the inventive indicator device, a feeling of the change in condition is transmitted to the observer.

In accordance with the invention, an indicator device for indicating the state of an observed condition or a change in said condition comprises an indicator face having, on a viewing surface thereon, a scale representative of states of said observed condition; an illuminatable path on said surface of said face and adjacent said scale; said path being illuminatable from one end of said path to the other end of said path in such a manner that, when a portion of said path is illuminated, all of said path from one end thereof to said portion is illuminated, while the remainder of said path, from said portion to the other end thereof, is not illuminated; the reading on the scale adjacent the end of the illuminated portion of said path being representative of the state of the observed condition, and at least one light source for illuminating said illuminatable path.

Preferably, the illuminatable paths comprise a plurality of illuminatable elements, each one of which is separately illuminatable.

Preferably again, each of the elements comprises strands of fiber optic cable, the entire arrangement comprising a separate light source for each element.

In this specification, illuminatable means capable of being illuminated.

The invention will be better understood by an examination of the following text together with the accompanying drawings in which.

Figure 1:
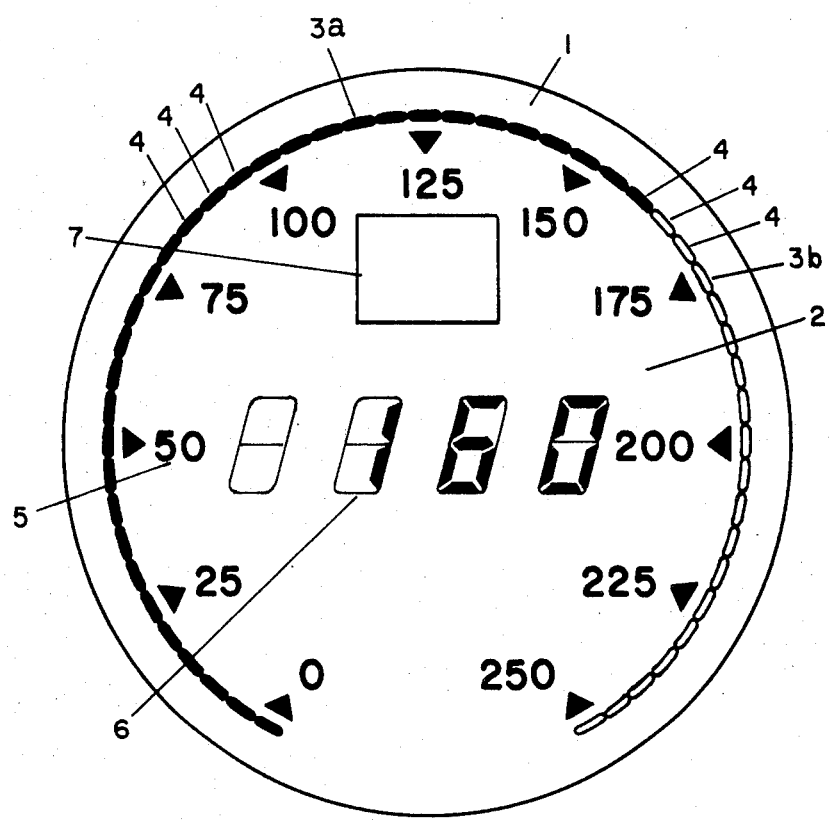
FIG. 1 illustrates an indicator face using an illuminatable path as an indicator in accordance with the invention.

In FIG. 1, an indicator device 1 comprises a face 2 having an illuminatable path 3 adjacent the outer edge thereof. The path comprises a plurality of elements 4 each one of which is adaptable to be individually illuminated. In accordance with the invention, the elements are illuminated in a clockwise direction, and when a further element is illuminated, all elements preceding the further element remain illuminated. To illustrate this in FIG. 1, all of the elements in portion 3a of the path are shown illuminated, whereas all of the elements in portion 3b of the path are shown as not illuminated.

The end of the illuminated portion of the path is adjacent to the number on the scale 5 which is indicative of the condition being observed. Conveniently, the number of elements between the numbers on the scale can be equal to or an even multiple of the interval between the numbers on the scale. So, in the figure, the number of elements between the numbers on the scale is equal to five, and the interval between the numbers on the scale is equal to 25. In accordance with the above, the indicator shown in FIG. 1 is indicating a condition of 160.

As can be seen, the use of the novel illuminatable path indicating means permits the unobscured view of further readout means 6 and 7. Although these have been shown as a digital readout means and a flag means respectively, other readout means could be incorporated in the center of the indicator face.

A change in condition is displayed by illuminating or extinguishing elements at the end of the existing illuminated portion of the path. The effect of this on an observer of the indicator is to give a feeling of the change in the condition which initiates the further illuminating and extinguishing of the elements.

As is well known, the condition being observed may be the condition of any physical variable such as altitude, speed, voltage, temperature, etc. and the invention is not restricted to any one of these.

Each of the elements in the path has a separate light source associated with it, and the light source, when activated, illuminates its associated element. A system for driving the light sources is illustrated in FIG. 2.

Figure 2:
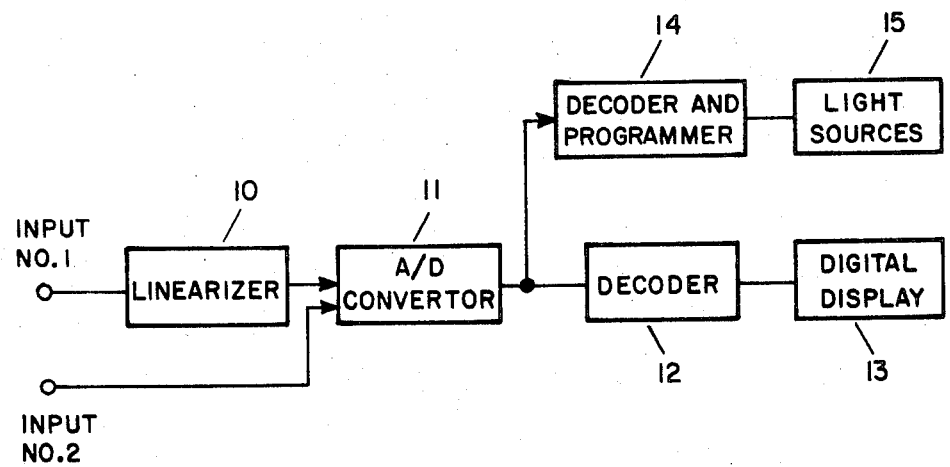
FIG. 2 shows an electrical system for illuminating the path of the indicator device of FIG. 1.

In FIG. 2, inputs 1 and 2 are alternatives and the output of any instrument will be connected to only one of these. Input 1 is used when the output of the instrument is non-linear, e.g., logarithmic. In this case, the output must be converted to linear form in the linealizer 10 before being applied to the A/D convertor 11. When the output of the instrument is linear, it is applied directly to the A/D convertor through the input 2.

The digital output of the A/D convertor is applied to the decoder and programmer 14 which is programmed to drive the light sources 15 in a sequential fashion. In addition, the decoder and programmer is adapted to decode the input signal and is programmed to illuminate the number of elements required to indicate the condition measured by the instrument. The output of the A/D convertor may also be applied to a further decoder 12 which may be adapted to drive a digital display 13 such as the digital display 6 in FIG. 1.

Figure 3:
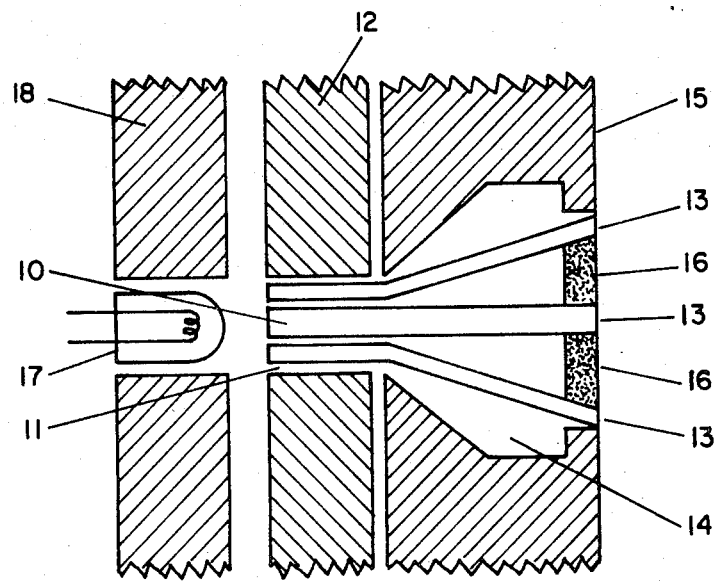
FIG. 3 illustrates how the path can be constructed when the path comprises strands of fiber optic cable.

In the preferred embodiment, the path is constructed of strands of fiber optic cable, and each element 4 in FIG. 1 comprises strands of fiber optic cable. One method for placing the fiber optic cable in a display device is illustrated in FIG. 3. In FIG. 3, a bunch of cable 10 is inserted in a through hole 11 of the backplate 12. The individual strands are then separated in cavity 14 of the frontplate 15. Each strand is held in place at the front by an epoxy matrix 16. It is, of course, understood that each strand is terminated along the front face of the device as illustrated in FIG. 4.

A light source 17 is surrounded by a heat sink 18 to complete the arrangement. As is apparent, each element 4 in FIG. 1 will require a separate light source.

While a particular embodiment has been described in the foregoing, this was for the purpose of illustrating, but not limiting the invention. Various modifications which will come readily to the mind of one skilled in the art are considered to be within the scope of the invention as defined in the appended claims.

I claim:

1. An illuminatable path for an indicator device for indicating states of a detected condition or a change in such condition, said indicator device comprising a face plate having two surfaces, one of said surfaces being a viewing surface, the other surface opposing said viewing surface, a back plate adjacent to said opposing surface; and a scale on said viewing surface representative of the states of said conditions or changes; said illuminatable path comprising; a plurality of openings in said face plate extending from said viewing surface to said opposing surface; said openings being located adjacent said scale on said viewing surface; a plurality of openings in said back plate equal in number to the plurality of openings in said face plate; each said opening in said back plate corresponding and being adjacent to an opening in said face plate; a separate bunch of strands of fiber optic material extending from each opening in said back plate through said back plate through said opening in said face plate to said viewing surface; the individual strands of each bunch being separated as the bunch extends through the corresponding opening in said face plate to comprise a set of individual strands in each opening at the viewing surface of said face plate; said strands being embedded in a matrix of epoxy material in each opening at the viewing surface of said face plate; and separate means for illuminating each said bunch.

2. A path as defined in claim 1 and further comprising a plurality of heat sinks, said plurality of heat sinks being equal in number to said plurality of openings in said back plate; each one of said heat sinks being located on the side of the back plate opposite that side adjacent to the face plate; each of said heat sinks being adjacent an opening in said back plate; and wherein said separate means of illuminating each said bunch comprises light bulbs, each said bulbs being surrounded by one of said heat sinks.

3. A path as defined in claim 2 wherein said path comprises a first end and a second end; said bulbs being adapted to be lit up in sequence from said first end to said second end in such a manner that, when a point intermediate said first end and said second end is to be indicated, all of the bulbs from said first end to said intermediate point will be lit up, and all the bulbs from said intermediate point to said second end will not be lit up.

* * * * *